Patented Feb. 28, 1939

2,149,240

UNITED STATES PATENT OFFICE 2,149,240

VAGINAL PREPARATION

Moses L. Crossley, Plainfield, N. J., assignor to The Calco Chemical Co., Inc., Bound Brook, N. J., a corporation of Delaware No Drawing. Application May 19, 1938, Serial No. 208,824

12 Claims. (Cl. 167—58)

This invention relates to vaginal preparations and particularly those in the form of jellies.

According to the present invention, the vaginal preparations contain as their principal ingredient a small amount of an ester of a sulfodicarboxylic acid, such as a sulfosuccinate. It has been found that the powerful surface tension reducing effects of esters of sulfodicarboxylic acids, such as sulfosuccinic acid, and particularly the esters of amyl, hexyl, heptyl and octyl alcohol, such as the dioctyl sulfosuccinate, are effective in immobilizing micro-organisms and in the case of spermatozoa, the sulfodicarboxylic esters exert a strong lytic action. As a result of the immobilizing and lytic action of the esters of sulfodicarboxylic acids, preparations, particularly in jelly form and containing very low concentrations of the active ingredient, are very effective in immobilizing micro-organisms, such as for example those which are observed in conditions of *Trichomonas vaginalis*. The same properties also render the preparations strongly spermacidal.

It is an advantage of the present invention that the primary active ingredients are of low toxicity, and, in spite of their lytic power, do not appear to have any deleterious action on the mucous membrane of the vagina itself.

While the present invention is directed broadly to preparations containing esters of sulfodicarboxylic acids, it is desirable to incorporate in the preparations acidic components to produce relatively low pH's which have been found to be effective. While any of the ordinary acids, such as lactic acid, may be used to produce a suitable pH, I have found that maleic acid is particularly effective and appears to enhance the activity, and particularly the spermacidal effect, of the sulfodicarboxylic esters. The maleic acid also increases the bacteriostatic effect of the preparation which is high and which tends to favor the destruction of pathogenic bacteria when used under the proper conditions. A small amount of thymol which is insufficient in itself for effective bacteriostatic or spermacidal action also appears to enhance the activity of the sulfodicarboxylic esters and in a more specific modification of the invention, the use of maleic acid and very small amounts of thymol are included.

The present invention is not limited to any particular form of jelly, and those of the oleaginous type may be used. However, I have found that the activity of the sulfodicarboxylic acid esters is greater in carbohydrate jellies, such as those obtained with tapioca flour and a small amount of gum tragacanth. Carbohydrate jellies not only are very effective in their spreading power on mucous membranes, but they also hydrate and flow with the normal secretions of the membranes and ensure a uniform concentration over the entire surface. The water dispersibility of the sulfodicarboxylic esters also render them more easily distributed by a hydrophilic jelly rather than a hydrophobic one.

I do not know the exact way in which the preparations of the present invention function in immobilizing and destroying of sperm cells and/or micro-organisms, but I believe that the essential mechanism is due to the wetting properties of the substances and to their lytic properties. Sodium dioctyl sulfosuccinate is well known as an extremely effective modifier of surface tension and has very great lytic action. In concentrations of 1 to 10,000, 100% lysis of washed rabbit blood cells is effected in a second or less, and even in concentrations of 1 to 50,000, complete lysis takes place in about 2.2 minutes. This lytic action may be compared with a well known lysin, saponin, which requires more than 100 times as long in 1 to 10,000 concentration and about 4 times as long in a 1 to 50,000 concentration.

In spite of the surprisingly high lytic action of the sulfodicarboxylic esters, they are practically non-irritating to the vaginal membrane. This is even true in the case of rabbits which received daily intravaginal injections of a 2.5% solution of sodium dioctylsulfosuccinate in 4% gum tragacanth over a period of three months without showing any signs of gross irritation. This test, which is with a higher concentration than is normally used, is particularly striking because the columnar epithelium of the vaginal mucosae of the rabbit is much more sensitive to irritants than the stratified epithelium mucosae of higher animals and man.

The toxicity of sodium dioctylsulfosuccinate is low. 80% of the rabbits subjected to slow intravenous administration of 40 mg. per kg. of body weight survived. Extensive tests over months show no evidence of absorption of the ester from the vaginal canal into the systemic circulation.

The spermacidal activity of the sulfodicarboxylic acid esters was measured on guinea pig sperm cells which were suspended in a buffered glucose-saline solution at pH 7.6 and dilute solutions of sodium dioctylsulfosuccinate were added. Other measurements were made in buffered glucose-saline solutions to which egg albumen had been added. In the buffered glucose-saline solution, complete immobilization was obtained with concentrations of 1 to 3200 in five minutes and in concentrations of 1 to 6400 in ten minutes. In the solution containing 2% egg albumen, complete immobilization occurred with concentrations of 1 to 1600 in five minutes and 1 to 3200 in ten minutes.

The invention will be described in greater detail in conjunction with the following specific example.

*Example*

0.2 part of gum tragacanth is dispersed in 15 parts of glycerine and the dispersion thoroughly mixed with 62 parts of water. Then 0.1 part of sodium benzoate, 0.5 part of maleic acid and 0.14 part of sodium hydroxide followed by 11 parts of tapioca flour are added. When all of the tapioca flour is added, heating is started and continued until the mixture reaches 74° C., stirring being maintained. The temperature is kept there until the jelly thickens considerably and at this point is added 10 parts of water containing 0.5 part of Gardinol WA (sulfated higher aliphatic alcohols), 0.25 part of sodium dioctylsulfosuccinate and 0.022 part of thymol. The heating is then shut off, the hot mixture stirred thoroughly about ten minutes, cooled with a water bath, allowed to stand over-night and tubed. The pH is approximately 3.7.

Clinical tests show the jelly to be smooth, elastic, non-irritating and effective, particularly in combatting conditions of *Trichomonas vaginalis*. It is an important aid in gynecological procedures, being soothing in certain types of vaginal irritation and has been shown to have high spermacidal effects on human spermatozoa.

Similar results are obtained with other sulfodicarboxylic acid esters, such as sodium dicapryl sulfosuccinate, sodium diamyl and sodium di (methyl amyl). Esters of other sulfodicarboxylic acids are likewise useful.

What I claim is:

1. A vaginal preparation containing a sulfodicarboxylic acid ester.
2. A vaginal preparation containing an ester of sulfosuccinic acid.
3. A vaginal preparation containing an ester of sulfosuccinic acid and an alcohol of the paraffin series having five to eight carbon atoms.
4. A vaginal preparation containing a sulfodicarboxylic acid ester and maleic acid.
5. A vaginal preparation containing an ester of sulfosuccinic acid and maleic acid.
6. A vaginal preparation containing an ester of sulfosuccinic acid, maleic acid and a small amount of thymol.
7. A jelly for intra-vaginal use containing a sulfodicarboxylic acid ester.
8. A jelly for intra-vaginal use containing a sulfosuccinic acid ester.
9. A jelly for intra-vaginal use containing a sulfosuccinic acid ester of an alcohol of the paraffin series having from five to eight carbon atoms.
10. A jelly for intra-vaginal use containing a sulfodicarboxylic acid ester and maleic acid.
11. A jelly for intra-vaginal use containing a sulfosuccinic acid ester and maleic acid.
12. A jelly for intra-vaginal use containing a sulfosuccinic acide ester, maleic acid and a small amount of thymol.

MOSES L. CROSSLEY.